(12) United States Patent
Pu et al.

(10) Patent No.: US 12,155,598 B2
(45) Date of Patent: Nov. 26, 2024

(54) SIGNAL TRANSMISSION METHOD AND COMMUNICATIONS DEVICE

(71) Applicant: VIVO MOBILE COMMUNICATION CO., LTD., Guangdong (CN)

(72) Inventors: Wenjuan Pu, Guangdong (CN); Xiaodong Yang, Guangdong (CN); Wei Bao, Guangdong (CN); Jing Liang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 297 days.

(21) Appl. No.: 17/734,762

(22) Filed: May 2, 2022

(65) Prior Publication Data

US 2022/0263612 A1     Aug. 18, 2022

Related U.S. Application Data

(63) Continuation of application No. PCT/CN2020/127076, filed on Nov. 6, 2020.

(30) Foreign Application Priority Data

Nov. 7, 2019 (CN) .......................... 201911083574.9

(51) Int. Cl.
*H04L 5/00* (2006.01)
*H04W 48/10* (2009.01)
(Continued)

(52) U.S. Cl.
CPC ............ *H04L 5/005* (2013.01); *H04L 5/0064* (2013.01); *H04W 48/10* (2013.01); *H04W 92/10* (2013.01); *H04W 92/18* (2013.01)

(58) Field of Classification Search
None
See application file for complete search history.

(56) References Cited

U.S. PATENT DOCUMENTS 7,155,229 B2    12/2006   Dent
2017/0230923 A1  8/2017   Huang et al.
(Continued)

FOREIGN PATENT DOCUMENTS

CN    104219758 A    12/2014
CN    106535355 A    3/2017
(Continued)

OTHER PUBLICATIONS

ZTE, "Coexistence of Sidelink V2X and Uu Transmission", R2-168168, 3GPP TSG-RAN WG2 Meeting #96, Nov. 18, 2016, 3 pgs.
(Continued)

*Primary Examiner* — Hong S Cho
(74) *Attorney, Agent, or Firm* — Price Heneveld LLP

(57) ABSTRACT

Embodiments of this disclosure provide a signal transmission method and a communications device. The method includes: determining a transmission priority in a case that transmission of a first signal conflicts with transmission of a second signal; and preferentially transmitting or receiving the first signal based on the transmission priority, or preferentially transmitting or receiving the second signal based on the transmission priority; where the first signal includes a SLSS or a signal carried by a PSBCH.

6 Claims, 4 Drawing Sheets

(51) Int. Cl.
  *H04W 92/10* (2009.01)
  *H04W 92/18* (2009.01)

(56) References Cited

U.S. PATENT DOCUMENTS

| | | | |
|---|---|---|---|
| 2018/0139769 A1 | 5/2018 | Lee et al. | |
| 2019/0141647 A1 | 5/2019 | Nimbalker et al. | |
| 2019/0253977 A1* | 8/2019 | Wang | H04W 52/383 |
| 2019/0253990 A1 | 8/2019 | Lee et al. | |
| 2020/0112989 A1 | 4/2020 | Zeng et al. | |
| 2022/0330266 A1* | 10/2022 | Huang | H04W 72/56 |

FOREIGN PATENT DOCUMENTS

| | | |
|---|---|---|
| CN | 106888494 A | 6/2017 |
| CN | 107690832 A | 2/2018 |
| CN | 109891987 A | 6/2019 |
| CN | 110050453 A | 7/2019 |
| EP | 3547632 A1 | 2/2019 |
| WO | 2018062850 A1 | 4/2018 |
| WO | 2018082571 A1 | 5/2018 |
| WO | 2018133132 A1 | 7/2018 |
| WO | 2018203669 A1 | 11/2018 |
| WO | 2019088804 A1 | 5/2019 |

OTHER PUBLICATIONS

Huawei, Hisilicon, "Sidelink physical layer procedures for NR V2X,", R1-1812205, 3GPP TSG RAN WG1 Meeting #95, Nov. 16, 2018, 12 pgs.
Intel Corporation, "In-device Coexistence for LTE V2X and NR V2X Sidelink Communication,", R1-1904298, 3GPP TSG RAN WG1 Meeting #96bis, Apr. 12, 2019, 10 pgs.
International Application No. PCT/CN2020/12076 International Search Report and Written Opinion with Partial English Machine Translation mailed Feb. 18, 2021, 8 pgs.
Examination Report for corresponding India application 202217031550 issued Oct. 28, 2022, 6 pgs.
Extended European search report for corresponding EP patent application 20884556.0, dated Dec. 8, 2022, 9 pgs.
Reasons for Refusal issued in Japanese Application No. 2022-522337, issued Mar. 15, 2023, with English machine translation, 6 pgs.
Qualcomm Incorporated "Inter-PLMN V2V Communication", 3GPP TSG-RAN WG2 #95, R2-164982, Gothenburg, Sweden, Aug. 22-26, 2016.

\* cited by examiner

SIGNAL TRANSMISSION METHOD AND COMMUNICATIONS DEVICE

CROSS-REFERENCE TO RELATED APPLICATIONS

The present disclosure is a continuation of International Application No. PCT/CN2020/127076, filed on Nov. 6, 2020, which claims priority to Chinese Patent Application No. 201911083574.9 filed with China on Nov. 7, 2019, which is incorporated herein by reference in its entirety.

TECHNICAL FIELD

Embodiments of this disclosure relate to the field of communications technologies, and particularly, to a signal transmission method and a communications device.

BACKGROUND

As shown in FIG. 1, a long term evolution (Long Term Evolution, LTE) system of release 12 (Release 12, Rel-12) or later supports sidelink (Sidelink, SL) for direct data transmission between terminals (for example, user equipments (User Equipment, UE)) without through a network device.

Sidelink transmission mode: Sidelink transmission in the related art mainly includes the following sidelink transmission modes: broadcast (broadcast), groupcast (groupcast), and unicast (unicast). Unicast, as its name implies, is a one-to-one (one to one) transmission. Groupcast is a one-to-many (one to many) transmission. Broadcast is also a one-to-many transmission, but for broadcast, there is no concept that UEs belong to a same group. The sidelink unicast and groupcast communications in the related art support a hybrid automatic repeat request (Hybrid Automatic Repeat Request, HARQ) feedback mechanism at a physical layer. The sidelink broadcast does not require feedback from a receiver.

LTE sidelink is designed to be applicable to specific public safety affairs (for example, emergency communication on a fire site or a disaster site such as an earthquake), vehicle to everything (vehicle to everything, V2X) communication, or the like. The vehicle to everything communication includes various services, for example, basic security communication, advanced (autonomous) driving, platooning, and sensor extension. LTE sidelink supports only broadcast communication, and therefore is mainly used for basic security communication. Other advanced V2X services with strict quality of service (Quality of Service, QoS) requirements in terms of delay and reliability are supported by new radio (New Radio, NR) sidelink.

When UE transmits or receives a sidelink synchronization signal (Sidelink Synchronization Signal, SLSS) through a PC5 interface, if there is a resource conflict with the transmission or reception of another channel/signal, the UE cannot determine which signal needs to be processed, resulting in a link communication failure.

SUMMARY

Embodiments of this disclosure is to provide a signal transmission method and a communications device.

According to a first aspect of this disclosure, a signal transmission method is provided, which includes:

determining a transmission priority in a case that transmission of a first signal conflicts with transmission of a second signal; and preferentially transmitting or receiving the first signal based on the transmission priority, or preferentially transmitting or receiving the second signal based on the transmission priority;

where the first signal includes a SLSS or a signal carried by a PSBCH.

According to a second aspect of this disclosure, a communications device is further provided, which includes:

a first determining module, configured to determine a transmission priority in a case that transmission of a first signal conflicts with transmission of a second signal; and a first transceiver module, configured to preferentially transmit or receive the first signal based on the transmission priority, or preferentially transmit or receive the second signal based on the transmission priority;

where the first signal includes a SLSS or a signal carried by a physical sidelink broadcast channel (PSBCH).

According to a third aspect of this disclosure, a communications device is further provided, which includes: a processor, a memory, and a program stored in the memory and capable of running on the processor, where when the program is executed by the processor, the steps of the signal transmission method according to the first aspect are implemented.

According to a fourth aspect of this disclosure, a computer-readable storage medium is further provided, where the computer-readable storage medium stores a computer program, and when the computer program is executed by a processor, the steps of the signal transmission method according to the first aspect are implemented.

In the embodiments of this disclosure, in a case that transmission of a SLSS or a signal carried by a PSBCH conflicts with transmission of a second signal, a transmission priority is determined, such that the SLSS or the signal carried by the PSBCH is preferentially transmitted or received, or the second signal is preferentially transmitted or received. In this way, a terminal is able to transmit a signal with a higher priority, improving reliability of a communications system.

BRIEF DESCRIPTION OF DRAWINGS

Those of ordinary skill in the art will be clear about other advantages and benefits by reading detailed description of the optional embodiments below. The accompanying drawings are merely intended to illustrate the objectives of the optional embodiments and are not intended to limit this disclosure. Throughout the accompanying drawings, the same reference signs represent the same components. In the accompanying drawings.

DESCRIPTION OF EMBODIMENTS

Figure 1:
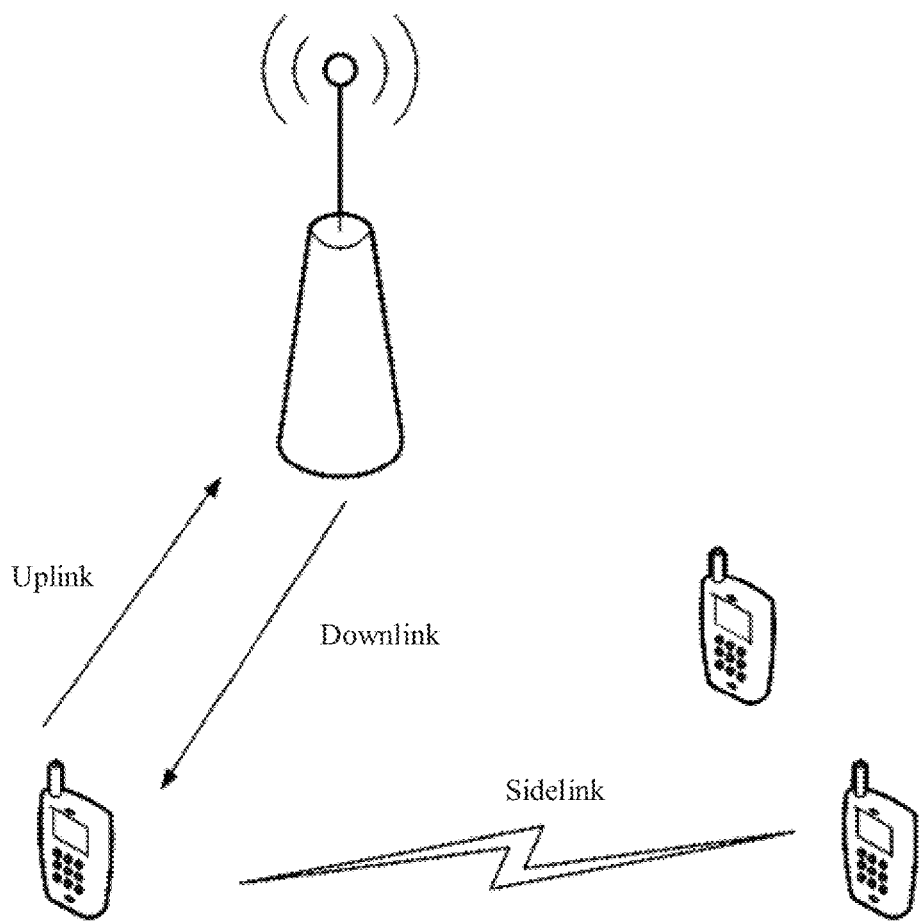
FIG. 1 is a schematic diagram of uplink (Uplink), downlink (Downlink), and sidelink (Sidelink) in an LTE system.

To help better understand the embodiments of this disclosure, the following technologies are introduced firstly:

I. Priority for Sidelink:

(I) Rel-12:

Proximity-based services (Proximity-based services, ProSe) provide direct discovery (Direct discovery, for example, allowing a terminal to discover a nearby terminal that can be directly connected to), direct communication (Direct communication, for example, exchanging data with a nearby terminal), and other functions. In a ProSe network architecture, a communications interface between terminals is called a PC5 interface, and an interface connecting a terminal and an access network device in an evolved universal terrestrial radio access network (Evolved Universal Terrestrial Radio Access Network, E-UTRAN) is called a Uu interface. In Rel-12, priorities for Uu interface (hereinafter referred to as Uu for short) data transmission and reception, PC5 discovery (discovery) transmission and reception, and PC5 communication (Communication) transmission and reception are stipulated as follows (in descending order of priority):

(1) Uu data transmission and reception;
(2) SL PC5 data transmission and reception; and
(3) SL PC5 discovery signal notification and monitoring.

(II) Release 13 (Release 13, Rel-13):

In Rel-13 version, to improve discovery transmission performance, a sidelink discovery gap (gap) (specially used for discovery reception/transmission) is introduced. In addition, considering particularity of a Uu random access channel (Random Access Channel, RACH), the priorities of Uu data transmission and reception, PC5 discovery transmission and reception, and PC5 communication transmission and reception have been rearranged as follows:

(1) Uu transmission and reception for RACH random access;
(2) SL PC5 discovery channel notification message (within a SL discovery gap);
(3) Non-random access channel (NON-RACH) data transmission;
(4) SL PC5 discovery monitoring (within a SL discovery gap);
(5) Uu NON-RACH data reception; and
(6) SL PC5 data transmission and reception.

In Rel-13, a proximity-based services per-packet priority (ProSe Per-Packet Priority, PPPP) is introduced. The PPPP can be divided into eight groups at most, with values ranging from 0 to 7. A smaller PPPP value corresponds to a higher priority for data packet transmission, and one data packet may correspond to one or more PPPPs.

(III) Release 14 (Release 14, Rel-14):

In Rel-14, a V2X SL communications technology is introduced. V2X is mainly used in in-vehicle communication and relates to safety issues. A priority for safety data transmission is higher than that for common data transmission. In addition, four control formats are defined for sidelink resource scheduling in 3GPP Rel-14, as shown in Table 1 below. In sidelink TM3 and sidelink TM4, a priority for data transmission is related to a "priority" parameter in sidelink control information (Sidelink Control Information, SCI) format 1. The parameter is also a PPPP value with the highest priority in PPPP values associated with a data packet at an application layer. If the "Priority" parameter value in SCI format 1 is smaller than a thresSL-TxPrioritization parameter value configured by a high layer (that is, the priority is high), a terminal transmits data over SL and suspends uplink data transmission over the Uu interface. Otherwise, if the "Priority" parameter value in SCI format 1 is greater than the thresSL-TxPrioritization parameter value, the terminal suspends data transmission over SL.

TABLE 1

| 3GPP Release | SL transmission mode (TM) | SCI | Description |
| --- | --- | --- | --- |
| R13 | SL TM1 | Downlink control information (Downlink Control Information, DCI) 5 | A network allocates SL transmission resources, for example, in an area with signal coverage. |
| R13 | SL TM2 | SCI format (format) 0 | A terminal autonomously selects SL transmission resources, for example, in an area with no signal coverage. |
| R14 | SL TM3 | DCI 5 A | Used for in-vehicle V2X. A network allocates SL transmission resources. Semi-persistent scheduling is introduced. |
| R14 | SL TM4 | SCI format 1 | Used for in-vehicle V2X. A terminal autonomously selects SL transmission resources, for example, in an area with no signal coverage. Semi-persistent scheduling is introduced. |

II. Sidelink Synchronization Signal/Broadcast Channel

An LTE sidelink synchronization signal is a SLSS, and a broadcast channel is a physical sidelink broadcast channel (Physical sidelink broadcast Channel, PSBCH), which are transmitted by transmit end UE through broadcasting, and received by receive end UE. An NR SLSS and a PSBCH are included in a sidelink synchronization signal block (Sidelink Synchronization Signal Block, S-SSB).

Figure 2:
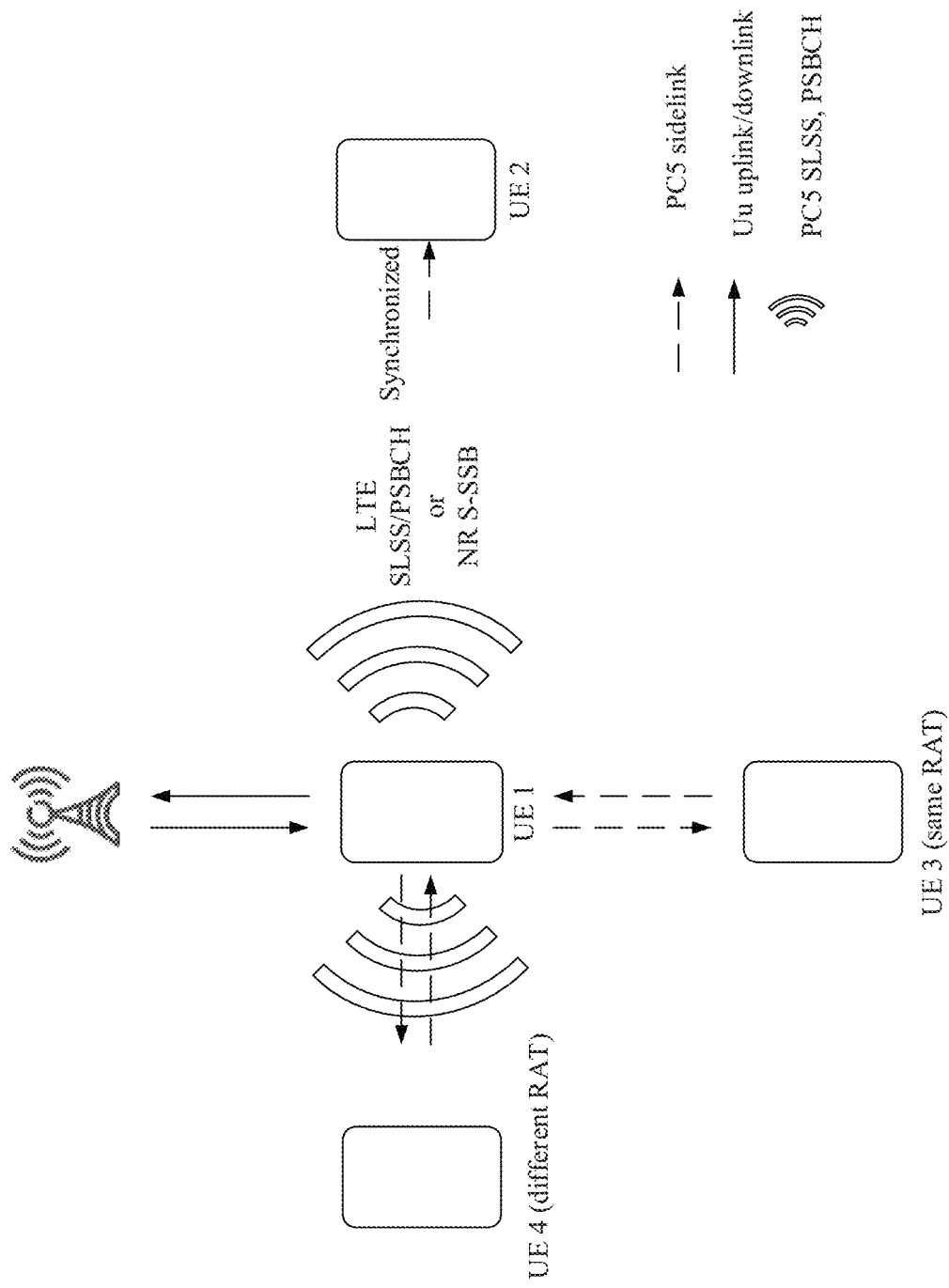
FIG. 2 is a schematic diagram of a transmission conflict between channels/signals.

As shown in FIG. 2, transmission or reception of the LTE SLSS/PSBCH and the NR S-SSB may conflict with transmission of the following channels/signals:

(1) Transmission or reception of SL data of a different RAT;
(2) Transmission or reception of Uu data of a different RAT;
(3) Transmission or reception of SLSSs of a different RAT (that is, LTE SLSSs/PSBCHs or NR S-SSBs);
(4) Transmission or reception of SL data of the same RAT; and
(5) Transmission or reception of Uu data of the same RAT.

However, for the foregoing resource collisions, a current protocol has not yet specified relevant solutions for LTE SLSSs/PSBCHs and NR S-SSBs.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure without creative efforts shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. In addition, in the specification and claims, the use of "and/or" represents presence of at least one of the connected objects, for example, "A and/or B" indicates that the following three cases: only A, only B, or both A and B.

In the embodiments of this disclosure, the terms such as "an example" or "for example" are used to represent an example, an illustration, or a description. Any embodiment or design solution described as "an example" or "for example" in the embodiments of this disclosure shall not be interpreted as being more preferred or advantageous than other embodiments or design solutions. To be precise, the terms such as "example" or "for example" are intended to present a related concept in a specific manner.

The technologies described herein are not limited to long term evolution (Long Time Evolution, LTE)/LTE-Advanced (LTE-Advanced, LTE-A) system, and are also applicable to various wireless communications systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems.

The terms "system" and "network" are usually used interchangeably. The CDMA system can implement radio technologies such as CDMA2000 and universal terrestrial radio access (Universal Terrestrial Radio Access, UTRA). UTRA includes wideband CDMA (Wideband Code Division Multiple Access, WCDMA) and other CDMA variants. The TDMA system may implement radio technologies such as global system for mobile communications (Global System for Mobile Communication, GSM). The OFDMA system can implement radio technologies such as ultra mobile broadband (Ultra Mobile Broadband, UMB), evolved UTRA (Evolved-UTRA, E-UTRA), IEEE 802.11 (wireless fidelity, (Wireless Fidelity, Wi-Fi)), IEEE 802.16 (worldwide interoperability for microwave access (Worldwide Interoperability for Microwave Access, WiMAX)), IEEE 802.20, and Flash-OFDM. UTRA and E-UTRA are part of the universal mobile telecommunications system (Universal Mobile Telecommunications System, UMTS). LTE and more advanced LTEs (for example, LTE-A) are new releases of UMTS that use E-UTRA. UTRA, E-UTRA, UMTS, LTE, LTE-A, and GSM are described in documents from an organization named "3rd Generation Partnership Project" (3rd Generation Partnership Project, 3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies.

An access network device provided in the embodiments of this disclosure may be a base station. The base station may be a commonly used base station or an evolved node base station (evolved node base station, eNB), or may be a network device in a 5G system (for example, a next generation node base station (next generation node base station, gNB) or a transmission and reception point (transmission and reception point, TRP)), or the like.

The terminal provided in the embodiments of this disclosure may be a mobile phone, a tablet computer, a notebook computer, an ultra-mobile personal computer (Ultra-mobile Personal Computer, UMPC), a netbook, a personal digital assistant (Personal Digital Assistant, PDA), a mobile Internet device (Mobile Internet Device, MID), a wearable device (Wearable Device), a vehicle-mounted device, or the like.

Figure 3:
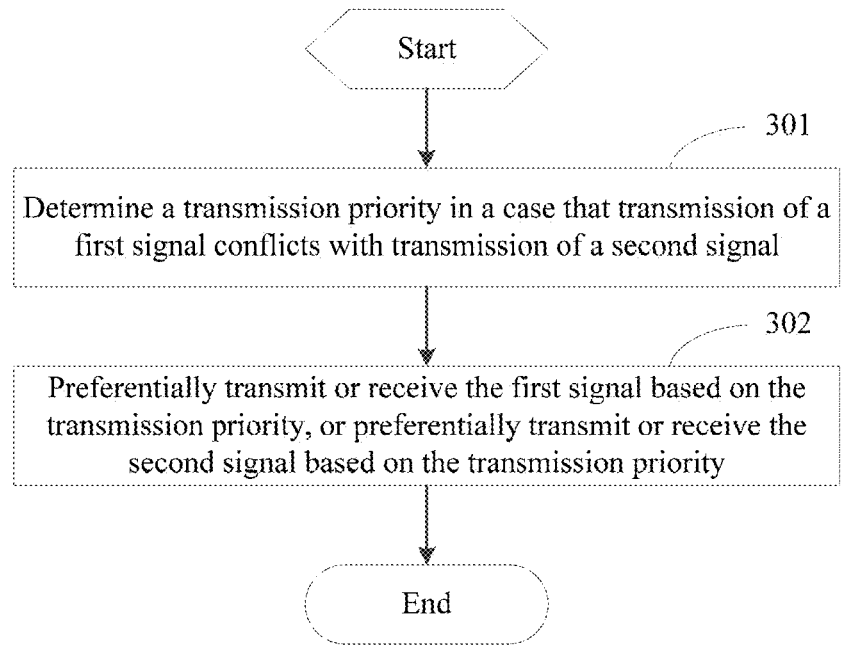
FIG. 3 is a schematic flowchart of a signal transmission method according to an embodiment of this disclosure.

Referring to FIG. 3, an embodiment of this disclosure provides a signal transmission method. The method may be performed by a communications device such as a terminal and includes step 301 and step 302.

Step 301: Determine a transmission priority in a case that transmission of a first signal conflicts with transmission of a second signal.

The first signal includes a SLSS or a signal carried by a PSBCH.

In this embodiment, the transmission priority includes that a transmitting or receiving priority of the first signal is higher than a transmitting or receiving priority of the second signal or that a transmitting or receiving priority of the second signal is higher than a transmitting or receiving priority of the first signal.

Step 302: Preferentially transmit or receive the first signal based on the transmission priority, or preferentially transmit or receive the second signal based on the transmission priority.

In this embodiment, based on the transmission priority, the first signal is preferentially transmitted or received or the second signal is preferentially transmitted or received, so that in a case that transmission of the SLSS or the signal carried by the PSBCH conflicts with the transmission of the second signal, a terminal can transmit or receive the signal with a higher priority.

It can be understood that if the terminal's capability allows only one transmission at one time, the terminal transmits a signal with a higher priority and stop transmitting a signal with a lower priority. If the terminal's capability allows dual transmissions at one time, the terminal transmits a signal with a higher priority, and transmits a signal with a lower priority at a reduced power.

For example, if a transmitting priority of the first signal is higher than a transmitting priority of the second signal, the first signal is transmitted, and transmission of the second signal is stopped; or the first signal is transmitted, and the second signal is transmitted at a reduced power.

For another example, if a transmitting priority of the second signal is higher than a transmitting priority of the first signal, the second signal is transmitted, and transmission of the first signal is stopped; or the second signal is transmitted, and the first signal is transmitted at a reduced power.

For example, if the terminal's capability allows only one transmission at one time, and a transmitting priority of the SLSS or the signal carried by the PSBCH is higher than a transmitting priority of the second signal, the terminal transmits the SLSS or the signal carried by the PSBCH. If the terminal's capability allows dual transmissions at one time, and a transmitting priority of the SLSS or the signal carried by the PSBCH is higher than a transmitting priority of the second signal, the terminal transmits the SLSS or the signal carried by the PSBCH at a first power, and transmits the second signal at a second power, where the second power is N % of a power for normally transmitting the second signal, and a value of N may be determined at a reduced power in the related art.

The second signal may include: a SLSS or a signal carried by a PSBCH, SL data (data) or Uu data (including a signal carried by a PRACH or a signal carried by a non-PRACH), and the like.

In this embodiment of this disclosure, the transmission priority may be determined based on one or more of signal types, priority parameters, priority thresholds, radio access technologies, and signal transmission directions of the first signal and second signal.

For example, the priority parameter may be represented as "priority", and a value of the priority parameter may range from 0 to 7. The transmission priorities of the first signal and second signal are determined by comparing values of the priority parameters. For example, a smaller value of the priority parameter corresponds to a higher transmission priority, or a larger value of the priority parameter corresponds to a higher transmission priority.

(1) Determine the transmission priority based on the signal types of the first signal and second signal.

For example, if the second signal includes sidelink data, and the first signal and the second signal are of different radio access technologies or a same radio access technology, it is determined that a transmitting or receiving priority of the first signal is higher than a transmitting or receiving priority of the second signal.

For example, if the second signal includes physical random access channel (Physical Random Access Channel, PRACH) data over a Uu interface, and the first signal and the second signal are of different radio access technologies or a same radio access technology, it is determined that a transmitting or receiving priority of the first signal is lower than a transmitting or receiving priority of the second signal.

For example, if the second signal includes non-PRACH data over a Uu interface, and the first signal and the second signal are of different radio access technologies or a same radio access technology, it is determined that a transmitting or receiving priority of the first signal is higher than a transmitting or receiving priority of the second signal.

(2) Determine the transmission priority based on the priority parameters and priority thresholds of the first signal and second signal.

For example, if the second signal includes a SLSS or a signal carried by a PSBCH, and the first signal and the second signal are of different radio access technologies, or if the second signal includes sidelink data, and the first signal and the second signal are of different radio access technologies or a same radio access technology, the transmission priority is determined based on a priority parameter of the first signal and a priority parameter of the second signal.

For example, if the priority parameter of the first signal is smaller than the priority parameter of the second signal, it is determined that a transmitting or receiving priority of the first signal is higher than a transmitting or receiving priority of the second signal; or, if the priority parameter of the first signal is greater than the priority parameter of the second signal, it is determined that a transmitting or receiving priority of the first signal is lower than a transmitting or receiving priority of the second signal.

Further, if the priority parameter of the first signal is equal to the priority parameter of the second signal, the transmission priority is determined based on one or more of priority thresholds, radio access technologies, and signal transmission directions of the first signal and second signal.

Further, if the priority parameter of the first signal is greater than a first priority threshold, and the priority parameter of the second signal is smaller than a second priority threshold, it is determined that a transmitting or receiving priority of the second signal is higher than a transmitting or receiving priority of the first signal; otherwise, it is determined that a transmitting or receiving priority of the first signal is higher than a transmitting or receiving priority of the second signal.

(3) Determine the transmission priority based on the priority thresholds of the first signal and second signal.

For example, in a case that the second signal is non-PRACH data over a Uu interface, and that the first signal and the second signal are of different radio access technologies or a same radio access technology, the transmission priority is determined.

If the priority parameter of the first signal is greater than a first priority threshold, and the priority parameter of the second signal is smaller than a second priority threshold, it is determined that a transmitting or receiving priority of the second signal is higher than a transmitting or receiving priority of the first signal; otherwise, it is determined that a transmitting or receiving priority of the first signal is higher than a transmitting or receiving priority of the second signal.

(4) Determine the transmission priority based on the radio access technologies of the first signal and second signal.

For example, if the second signal is a SLSS or a signal carried by a PSBCH, a radio access technology for the first signal is new radio (NR), and a radio access technology for the second signal is long term evolution (LTE), it is determined that a transmitting or receiving priority of the first signal is higher than a transmitting or receiving priority of the second signal; or it is determined that a transmitting or receiving priority of the first signal is lower than a transmitting or receiving priority of the second signal.

For example, if the second signal is sidelink data, a radio access technology for the first signal is NR, and a radio access technology for the second signal is LTE, it is determined that a transmitting or receiving priority of the first signal is higher than a transmitting or receiving priority of the second signal; or it is determined that a transmitting or receiving priority of the first signal is lower than a transmitting or receiving priority of the second signal.

For example, if the second signal is non-PRACH data over a Uu interface, a radio access technology for the first signal is NR, and a radio access technology for the second signal is LTE, it is determined that a transmitting or receiving priority of the first signal is higher than a transmitting or receiving priority of the second signal; or it is determined that a transmitting or receiving priority of the first signal is lower than a transmitting or receiving priority of the second signal.

(5) Determine the transmission priority based on the transmission directions of the first signal and second signal.

If the second signal is a SLSS or a signal carried by a PSBCH, and the first signal and the second signal are of different radio access technologies; or if the second signal is sidelink data, and the first signal and the second signal are of different radio access technologies or a same radio access technology; or if the second signal is non-PRACH data over a Uu interface, and the first signal and the second signal are of different radio access technologies or a same radio access technology, one of the following is determined:

a transmitting priority of the first signal or second signal is higher than a receiving priority of the first signal or second signal; or a transmitting priority of the first signal or second signal is lower than a receiving priority of the first signal or second signal.

In this embodiment of this disclosure, in a case that the transmission of the SLSS or the signal carried by the PSBCH conflicts with the transmission of the second signal, a transmission priority is determined, such that the SLSS or the signal carried by the PSBCH is preferentially transmitted or received, or the second signal is preferentially transmitted or received. In this way, a terminal is able to transmit a signal with a higher priority, improving reliability of a communications system.

For better understanding of this embodiment of this disclosure, the following assumes that the first signal and the second signal are both SLSS, and describes a priority handling method for SLSS when the SLSS conflicts with another signal/channel in the following two scenarios. The conflict between the SLSS and another signal/channel includes the following two scenarios.

Scenario 1: resource collision with PC5 SL transmission or Uu transmission of a different radio access technology (Radio Access Technology, RAT).

For example, a resource collision occurs between PC5 RAT1 SLSS transmission or reception and PC5 RAT2 SLSS transmission or reception.

A resource collision occurs between PC5 RAT1 SLSS transmission or reception and PC5 RAT2 SL data transmission or reception.

A resource collision occurs between PC5 RAT1 SLSS transmission or reception and Uu RAT2 uplink (Uplink, UL)/downlink (downlink, DL) data transmission or reception.

It can be understood that RAT1 may be LTE, NR, or the like, and RAT2 may be NR, LTE, or the like.

Scenario 2: resource collision with PC5 SL transmission and Uu transmission of a same RAT.

For example, a resource collision occurs between PC5 RAT1 SLSS transmission or reception and PC5 RAT1 SL data transmission or reception.

For example, a resource collision occurs between PC5 RAT1 SLSS transmission or reception and Uu RAT1 UL/DL data transmission or reception.

It can be understood that RAT1 may be LTE, NR, or the like.

In the priority processing method of the SLSS, a priority parameter, which may also be called priority, may be set for each of the first signal and the second signal. For example, the priority parameter is represented as "priority", and a value of the priority parameter may range from 0 to 7. The transmission priorities of the first signal and second signal are determined by comparing values of the priority parameters. For example, a smaller value of the priority parameter corresponds to a higher transmission priority, or a larger value of the priority parameter corresponds to a higher transmission priority.

In addition, for some conflict cases, a priority threshold may be introduced to further determine the transmission priorities of the first signal and second signal. For example, a priority threshold of the SLSS may be set to thres_slss, and a priority threshold of Uu SL data may be set according to a protocol in the related art, for example, is represented as thres_Uu.

For ease of description, the following scenarios are described based only on a case that the first signal and the second signal are SLSSs. It can be understood that the first signal and the second signal may alternatively be signals carried by a PSBCH. When the signal carried by the PSBCH conflicts with another signal/channel, for the priority processing method of the signal carried by the PSBCH, reference may be made to the priority processing method of the SLSS, and details are not repeated herein.

Scenario 1: Signal priority processing methods for different RATs:

When UE transmits or receives a RAT1 SLSS through a PC5 interface, processes described in the following 1, 2, or 3 are performed.

(1) In a case of a resource collision with PC5 RAT2 SLSS transmission or reception, the UE determines, according to the following rules, to transmit or receive the RAT1 SLSS or the RAT2 SLSS:

Rule 1: When a requirement of one transmission and one reception is met, the UE may determine priorities based on transmission directions, and perform the following a1 or a2.

(a1) If it is specified that a transmitting priority is higher than a receiving priority, the UE determines to transmit the RAT1 SLSS.

For example, when a transmitting priority of the PC5 RAT1 SLSS is higher than a receiving priority of the PC5 RAT2 SLSS, the RAT1 SLSS is transmitted through the PC5 interface.

(a2) If it is specified that the transmitting priority is lower than the receiving priority, the UE determines to receive the RAT2 SLSS.

For example, when a transmitting priority of the PC5 RAT1 SLSS is lower than a receiving priority of the PC5 RAT2 SLSS, the RAT2 SLSS is received through the PC5 interface.

Rule 2: The transmission priority may be determined by comparing priorities of the RAT1 SLSS and the RAT2 SLSS. Assuming that a smaller value of the priority corresponds to a higher priority, the following b1, b2, or b3 is performed.

(b1) In a case of the priority of the RAT1 SLSS<the priority of the RAT2 SLSS, the UE determines to transmit or receive the RAT1 SLSS.

(b2) In a case of the priority of the RAT1 SLSS>the priority of the RAT2 SLSS, the UE determines to transmit or receive the RAT2 SLSS.

(b3) In a case of the priority of the RAT1 SLSS=the priority of the RAT2 SLSS, the UE autonomously determines to transmit or receive a SLSS of a particular RAT.

Alternatively, the UE may further compare the priority thresholds. For example, in a case of the priority of the RAT1 SLSS>a priority threshold of the RAT1 SLSS and the priority of the RAT2 SLSS<a priority threshold of the RAT2 SLSS, the UE determines to transmit or receive the RAT2 SLSS; otherwise, UE determines to transmit or receive the RAT1 SLSS.

It can be understood that a higher priority value may alternatively correspond to a higher priority. For example, in a case of the priority of the RAT1 SLSS<the priority of the RAT2 SLSS, the UE determines to transmit or receive the RAT2 SLSS. Other cases are similar to this, and are not repeated herein.

Rule 3: The transmission priority may be determined based on a radio access technology.

For example, it is specified that a transmitting or receiving priority in NR is higher than a transmitting or receiving priority in LTE; or it is specified that a transmitting or receiving priority in LTE is higher than a transmitting or receiving priority in NR.

(2) In a case of a resource collision with PC5 RAT2 SL data transmission or reception, the UE determines to transmit or receive the RAT1 SLSS.

Rule 1: When a requirement of one transmission and one reception is met, the UE may determine priorities based on transmission directions, and perform the following a1 or a2.

(a1) If it is specified that a transmitting priority is higher than a receiving priority, the UE determines to transmit a signal.

For example, when a transmitting priority of the PC5 RAT1 SLSS is higher than a receiving priority of the PC5 RAT2 SL data, the RAT1 SLSS is transmitted through the PC5 interface.

(a2) If it is specified that the transmitting priority is lower than the receiving priority, the UE determines to receive a signal.

For example, when a transmitting priority of the PC5 RAT1 SLSS is lower than a receiving priority of the PC5 RAT2 SL data, the RAT2 SL data is received through the PC5 interface.

Rule 2: The transmission priority may be determined based on signal types.

If it is specified that a transmitting or receiving priority of the SLSS is higher than a transmitting or receiving priority of the SL data, the UE determines to transmit or receive the RAT1 SLSS.

If it is specified that a transmitting or receiving priority of the SLSS is lower than a transmitting or receiving priority of the SL data, the UE determines to transmit or receive the RAT2 SL data.

Rule 3: The transmission priority may be determined based on priority parameters and priority thresholds.

The transmission priority may be determined by comparing priorities of the RAT1 SLSS and the RAT2 SL data. Assuming that a smaller value of the priority corresponds to a higher priority, the following b1, b2, or b3 is performed.

(b1) In a case of the priority of the RAT1 SLSS<the priority of the RAT2 SL data, the UE determines to transmit or receive the RAT1 SLSS.

(b2) In a case of the priority of the RAT1 SLSS>the priority of the RAT2 SL data, the UE determines to transmit or receive the RAT2 SL data.

(b3) In a case of the priority of the RAT1 SLSS=the priority of the RAT2 SL data, the UE autonomously determines to transmit or receive a particular signal.

Alternatively, the UE may further compare the priority thresholds. For example: in a case of the priority of the RAT1 SLSS>a priority threshold of the RAT1 SLSS and the priority of the RAT2 SL data<a priority threshold of the RAT2 SL data, the UE determines to transmit or receive the RAT2 SL data; otherwise, UE determines to transmit or receive the RAT1 SLSS.

It can be understood that a higher priority value may alternatively correspond to a higher priority. For example, in a case of the priority of the RAT1 SLSS<the priority of RAT2 SL data, the UE determines to transmit or receive the RAT2 SL data. Other cases are similar to this, and are not repeated herein.

Rule 4: The transmission priority is determined based on the radio access technologies.

For example, a transmitting or receiving priority in NR is higher than a transmitting or receiving priority in LTE; or a transmitting or receiving priority in LTE is higher than a transmitting or receiving priority in NR.

(3) If a case of a resource collision with transmission or reception of RAT2 UL/DL data through a Uu interface, the UE may determine, according to the following rules, which signal is to be transmitted or received.

Rule 1: If a signal carried by a RAT2 PRACH is transmitted or received through a Uu interface, and due to the particularity of the PRACH, a transmitting or receiving priority of the signal carried by the PRACH over the Uu interface is higher than a transmitting or receiving priority of the RAT1 SLSS, the UE determines to transmit or receive the signal carried by the RAT2 PRACH over the Uu interface.

Rule 2: If RAT2 UL/DL data (NON-PRACH) is transmitted or received through a Uu interface, the following c1, c2, c3, or c4 is performed.

c1: When a requirement of one transmission and one reception is met: c11 or c12 is performed.

c11: If a transmitting priority is higher than a receiving priority, the UE determines to transmit the RAT1 SLSS.

For example, when a transmitting priority of the PC5 RAT1 SLSS is higher than a receiving priority of the Uu RAT2 UL/DL data, the RAT1 SLSS is transmitted through the PC5 interface.

c12: If the transmitting priority is lower than the receiving priority, the UE determines to receive the UU RAT2 UL/DL data.

For example, when a transmitting priority of the PC5 RAT1 SLSS is lower than a receiving priority of the Uu RAT2 data, the RAT2 data is received through the Uu interface.

c2: Priorities of the RAT1 SLSS and the Uu RAT2 data may be compared based on priority parameters and thresholds of the RAT1 SLSS and the Uu RAT2 data by performing the following c21, c22, c23, or c24.

c21: In a case of the priority of the RAT1 SLSS>thres_slss and the priority of the Uu RAT2 data<thres_Uu, that is, when the priority of the RAT1 SLSS is lower and the priority of the Uu RAT2 data is higher, the UE determines to transmit or receive the Uu RAT2 data.

c22: In a case of the priority of the RAT1 SLSS<thres_slss and the priority of the Uu RAT2 data>thres_Uu, the UE determines to transmit or receive the RAT1 SLSS.

c23: In a case of the priority of the RAT1 SLSS>thres_slss and the priority of the Uu RAT2 data>thres_Uu, the UE determines to transmit or receive the RAT1 SLSS.

c24: In a case of the priority of the RAT1 SLSS<thres_slss and the priority of the Uu RAT2 data<thres_Uu, the UE determines to transmit or receive the RAT1 SLSS.

c3: The transmission priority may be determined based on signal types.

For example, a transmitting or receiving priority of a signal carried by a non-PRACH over Uu is lower than a transmitting or receiving priority of the RAT1 SLSS.

c4: The transmission priority is determined based on radio access technologies.

For example, a transmitting or receiving priority in NR is higher than a transmitting or receiving priority in LTE; or a transmitting or receiving priority in LTE is higher than a transmitting or receiving priority in NR.

In a case of dual transmissions, if the UE's capability allows only one transmission at one time, the UE transmits a signal with a higher priority and stops transmitting a signal with a lower priority. If the UE's capability allows dual transmissions at one time, the UE transmits a signal with a higher priority, and transmits a signal with a lower priority at a reduced power.

Scenario II: Signal priority processing methods for a same RAT (for example, the RAT may be LTE, NR, or the like):

It can be understood that for the implementation procedure of Scenario 2, reference may be made to the descriptions in Scenario 1. A difference between Scenario 2 and Scenario 1 lies in that when the signal priority processing method is being determined, radio access technologies of signals may not be considered in comparison, and there is no conflict with a SLSS of a same RAT.

Figure 4:
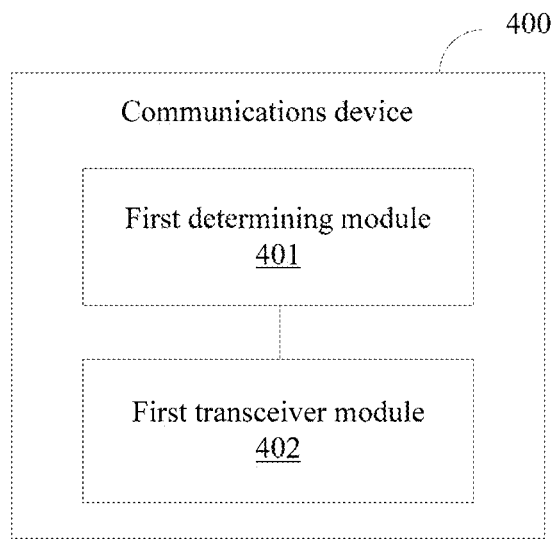
FIG. 4 is a first schematic structural diagram of a communications device according to an embodiment of this disclosure.

Referring to FIG. 4, an embodiment of this disclosure provides a communications device 400, including:

a first determining module 401, configured to determine a transmission priority in a case that transmission of a first signal conflicts with transmission of a second signal; and a first transceiver module 402, configured to preferentially transmit or receive the first signal based on the transmission priority, or preferentially transmit or receive the second signal based on the transmission priority;

where the first signal includes a sidelink synchronization signal (SLSS) or a signal carried by a physical sidelink broadcast channel (PSBCH).

Optionally, the first determining module 401 is further configured to determine the transmission priority based on one or more of signal types, priority parameters, priority thresholds, radio access technologies, and signal transmission directions of the first signal and second signal.

Optionally, the first determining module 401 is further configured to: if the second signal includes sidelink data, and the first signal and the second signal are of different radio access technologies or a same radio access technology, determine that a transmitting or receiving priority of the first signal is higher than a transmitting or receiving priority of the second signal; or if the second signal includes physical random access channel (PRACH) data over a Uu interface, and the first signal and the second signal are of different radio access technologies or a same radio access technology, determine that a transmitting or receiving priority of the first signal is lower than a transmitting or receiving priority of the second signal; or if the second signal includes non-PRACH data over a Uu interface, and the first signal and the second signal are of different radio access technologies or a same radio access technology, determine that a transmitting or receiving priority of the first signal is higher than a transmitting or receiving priority of the second signal.

Optionally, the first determining module 401 is further configured to: if the second signal includes a SLSS or a signal carried by a PSBCH, and the first signal and the second signal are of different radio access technologies, or if the second signal includes sidelink data, and the first signal and the second signal are of different radio access technologies or a same radio access technology, determine the transmission priority based on the priority parameter of the first signal and the priority parameter of the second signal.

Optionally, the first determining module 401 is further configured to: if the priority parameter of the first signal is smaller than the priority parameter of the second signal, determine that a transmitting or receiving priority of the first signal is higher than a transmitting or receiving priority of the second signal; or if the priority parameter of the first signal is greater than the priority parameter of the second signal, determine that a transmitting or receiving priority of the first signal is lower than a transmitting or receiving priority of the second signal.

Optionally, the first determining module 401 is further configured to: if a priority of the first signal is equal to a priority of the second signal, determine the transmission priority based on one or more of priority thresholds, radio access technologies, and signal transmission directions of the first signal and second signal.

Optionally, the first determining module 401 is further configured to: if the priority parameter of the first signal is greater than a first priority threshold, and the priority parameter of the second signal is smaller than a second priority threshold, determine that a transmitting or receiving priority of the second signal is higher than a transmitting or receiving priority of the first signal; otherwise, determine that a transmitting or receiving priority of the first signal is higher than a transmitting or receiving priority of the second signal;

where the second signal is non-PRACH data over a Uu interface, and the first signal and the second signal are of different radio access technologies or a same radio access technology.

Optionally, the first determining module 401 is further configured to: if the second signal is a SLSS or a signal carried by a PSBCH, a radio access technology for the first signal is new radio (NR), and a radio access technology for the second signal is long term evolution (LTE); or if the second signal is sidelink data, a radio access technology for the first signal is NR, and a radio access technology for the second signal is LTE; or if the second signal is non-PRACH data over a Uu interface, a radio access technology for the first signal is NR, and a radio access technology for the second signal is LTE, determine that a transmitting or receiving priority of the first signal is higher than a transmitting or receiving priority of the second signal or that a transmitting or receiving priority of the first signal is lower than a transmitting or receiving priority of the second signal.

Optionally, the first determining module 401 is further configured to: if the second signal is a SLSS or a signal carried by a PSBCH, and the first signal and the second signal are of different radio access technologies; or if the second signal is sidelink data, and the first signal and the second signal are of different radio access technologies or a same radio access technology; or if the second signal is non-PRACH data over a Uu interface, and the first signal and the second signal are of different radio access technologies or a same radio access technology, determine one of the following:

a transmitting priority of the first signal or second signal is higher than a receiving priority of the first signal or second signal; or a transmitting priority of the first signal or second signal is lower than a receiving priority of the first signal or second signal.

Optionally, the first transceiver module 402 is further configured to: if a transmitting priority of the first signal is higher than a transmitting priority of the second signal, transmit the first signal, and stop transmitting the second signal; or transmit the first signal, and transmit the second signal at a reduced power; or if a transmitting priority of the second signal is higher than a transmitting priority of the first signal, transmit the second signal, and stop transmitting the first signal; or transmit the second signal, and transmit the first signal at a reduced power.

The communications device provided in this embodiment of this disclosure may execute the foregoing method embodiment shown in FIG. 3, with a similar implementation principle and similar technical effects. Details are not repeated herein in this embodiment.

Figure 5:
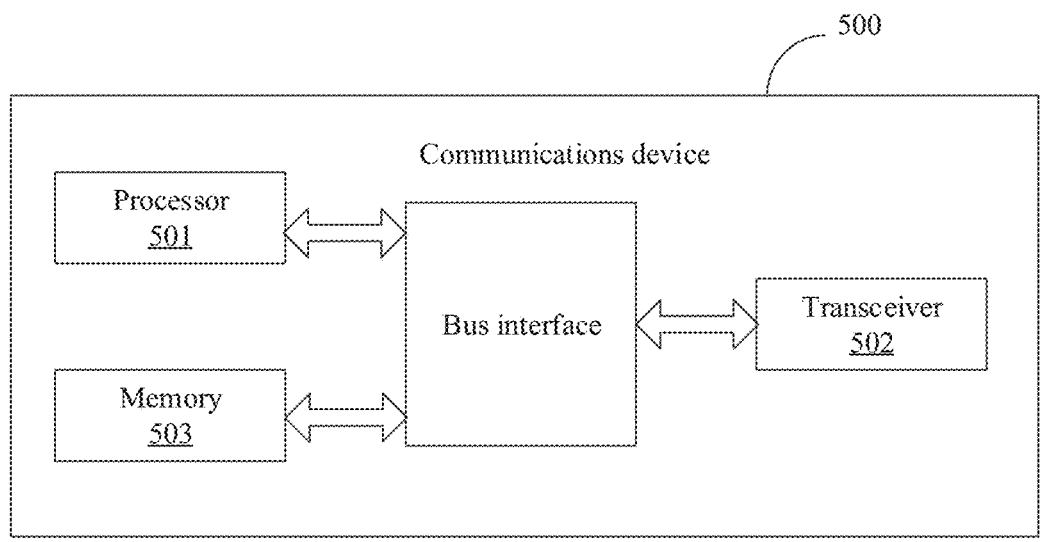
FIG. 5 is a second schematic structural diagram of a communications device according to an embodiment of this disclosure.

Referring to FIG. 5, FIG. 5 is a structural diagram of a communications device to which an embodiment of this disclosure is applied. As shown in FIG. 5, the communications device 500 includes a processor 501, a transceiver 502, a memory 503, and a bus interface. The processor 501 may be responsible for bus architecture management and general processing. The memory 503 may store data that the processor 501 uses when performing an operation.

In an embodiment of this disclosure, the communications device 500 further includes a program stored in the memory 503 and capable of running on the processor 501. When the program is executed by the processor 501, the steps of the foregoing method shown in FIG. 3 are implemented.

In FIG. 5, a bus architecture may include any quantity of interconnected buses and bridges, and connect together various circuits of one or more processors represented by the processor 501 and a memory represented by the memory 503. The bus architecture may further interconnect various other circuits such as a peripheral device, a voltage regulator, and a power management circuit. These are all common sense in the art, and therefore are not further described in this specification. The bus interface provides interfaces. The transceiver 502 may be a plurality of components, including a transmitter and a receiver, and provides units for communicating with a variety of other apparatuses on a transmission medium.

The communications device provided in this embodiment of this disclosure may execute the foregoing method embodiment shown in FIG. 3, with a similar implementation principle and similar technical effects. Details are not repeated herein in this embodiment.

Method or algorithm steps described in combination with the content disclosed in this disclosure may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read-only memory (Erasable PROM, EPROM), an electrically erasable programmable read-only memory (Electrically EPROM, EEPROM), a register, a hard disk, a removable hard disk, a compact disc read-only memory, or any other form of storage medium well-known in the art. For example, a storage medium is coupled to the processor, enabling the processor to read information from the storage medium or write information into the storage medium. Certainly, the storage medium may be a component of the processor. The processor and the storage medium may be located in an application-specific integrated circuit (Application Specific Integrated Circuit, ASIC). In addition, the ASIC may be located in a core network interface device. Certainly, the processor and the storage medium may exist in the core network interface device as discrete components.

A person skilled in the art should be aware that in the foregoing one or more examples, functions described in this disclosure may be implemented by hardware, software, firmware, or any combination thereof. In the case of implementation by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another place. The storage medium may be any available medium accessible by a general-purpose or dedicated computer.

The objectives, technical solutions, and benefits of this disclosure are further described in detail in the foregoing specific implementations. It should be understood that the foregoing descriptions are merely specific implementations of this disclosure, but are not intended to limit the protection scope of this disclosure. Any modification, equivalent replacement, or improvement made based on the technical solutions in this disclosure shall fall within the protection scope of this disclosure.

A person skilled in the art should understand that the embodiments of this disclosure may be provided as a method, a system, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a compact disc read-only memory (Compact Disc Read-Only Memory, CD-ROM), an optical memory, and the like) that include computer-usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the embodiments of this disclosure without departing from the spirit and scope of this disclosure. This disclosure is intended to cover these modifications and variations to the embodiments of this disclosure provided that they fall within the protection scope defined by the claims of this disclosure and their equivalent technologies.

What is claimed is:

1. A signal transmission method, comprising:
determining a transmitting or receiving priority of a first signal is lower than a transmitting or receiving priority of the second signal in a case that transmission of a first signal conflicts with transmission of a second signal; wherein the first signal comprises a sidelink synchronization signal (SLSS) or a signal carried by a physical sidelink broadcast channel (PSBCH), the second signal comprises physical random access channel (PRACH) data over a Uu interface; and preferentially transmitting or receiving the second signal.

2. The method according to claim 1, wherein
the first signal and the second signal are of different radio access technologies or a same radio access technology.

3. The method according to claim 1, wherein the preferentially transmitting or receiving the second signal comprises:

transmitting the second signal, and stopping transmitting the first signal; or transmitting the second signal, and transmitting the first signal at a reduced power.

4. A communications device, comprising a memory, a processor, and a program stored in the memory and capable of running on the processor, wherein the computer program, when executed by the processor, causes the communications device to perform-:

determining a transmitting or receiving priority of a first signal is lower than a transmitting or receiving priority of the second signal in a case that transmission of a first signal conflicts with transmission of a second signal; wherein the first signal comprises a sidelink synchronization signal (SLSS) or a signal carried by a physical sidelink broadcast channel (PSBCH), the second signal comprises physical random access channel (PRACH) data over a Uu interface; and preferentially transmitting or receiving the second signal.

5. The communications device according to claim 4, wherein the first signal and the second signal are of different radio access technologies or a same radio access technology.

6. A non-transitory computer-readable storage medium, wherein the non-transitory computer-readable storage medium stores a computer program, and the computer program is executed by a processor to implements:

determining a transmitting or receiving priority of a first signal is lower than a transmitting or receiving priority of the second signal in a case that transmission of a first signal conflicts with transmission of a second signal; wherein the first signal comprises a sidelink synchronization signal (SLSS) or a signal carried by a physical sidelink broadcast channel (PSBCH), the second signal comprises physical random access channel (PRACH) data over a Uu interface; and preferentially transmitting or receiving the second signal.

\* \* \* \* \*